United States Patent Office 3,203,962
Patented Aug. 31, 1965

3,203,962
ALPHA-PHENYL-BETA PYRROLIDINO-PROPIOPHENONES
Charles Ferdinand Huebner, Chatham, N.J., assignor to Ciba Corporation, New York, N.Y., a corporation of Delaware
No Drawing. Filed Oct. 11, 1962, Ser. No. 230,003
4 Claims. (Cl. 260—326.5)

The present invention concerns amino-ketones, or salts thereof; more especially, the invention relates to compounds of the formula

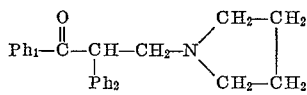

in which each of the groups $Ph_1$ and $Ph_2$ is a monocyclic carbocyclic aryl radical, and the acid addition salts thereof, as well as process for the manufacture of these compounds.

A monocyclic carbocyclic aryl radical representing $Ph_1$ and $Ph_2$ is phenyl or phenyl substituted by lower alkyl, hydroxyl, etherified hydroxyl, e.g., lower alkoxy, lower alkenyloxy and the like, esterified hydroxyl, e.g., lower alkoxy-carbonyloxy, lower alkanoyloxy, halogeno and the like, acyl, e.g., lower alkanoyl and the like, nitro, amino, such as tertiary amino, e.g., N,N-di-lower alkylamino and the like, trifluoromethyl or any analogous substituent; one or more than one of the same or of different substituents are attached to any of the positions available for substitution. Substituted phenyl groups are particularly (lower alkyl)-phenyl, in which lower alkyl has preferably from one to six carbon atoms, e.g., 2-methyl-phenyl, 4-methyl-phenyl, 3-ethyl-phenyl, 4-isopropyl-phenyl, 4-tertiary butyl-phenyl, 2,4-dimethyl-phenyl, 2,5-dimethyl-phenyl and the like, (hydroxy)-phenyl, e.g., 3-hydroxy-phenyl, 4-hydroxy-phenyl and the like, (etherified hydroxy)-phenyl, such as (lower alkoxy)-phenyl, in which lower alkoxy has preferably from one to six carbon atoms, e.g., 2-methoxy-phenyl, 4-methoxy-phenyl, 4-ethoxy-phenyl, 3,4-dimethoxy-phenyl, 3,4,5-trimethoxy-phenyl, 4-i-propyloxy-phenyl, 4-n-butyl-oxy-phenyl, 4-isopentyloxy-phenyl and the like, (lower alkenyloxy)-phenyl, in which lower alkenyl has preferably from two to six carbon atoms, e.g., 2-allyloxy-phenyl, 4-allyloxy-phenyl, 3-(2-butenyloxy)-phenyl and the like, or any other (etherified hydroxy)-phenyl group, (esterified hydroxy)-phenyl, such as (lower alkoxy-carbonyloxy)-phenyl, e.g., 3-methoxycarbonyloxy-phenyl, 4-ethoxy-carbonyloxy-phenyl and the like, (lower alkanoyloxy)-phenyl, e.g., 3-acetoxy-phenyl, 4-propionyloxy-phenyl and the like, (halogeno)-phenyl (halogeno representing a hydroxyl group esterified with a hydrohalic acid), e.g., 4-fluoro-phenyl, 2-chloro-phenyl, 4-chloro-phenyl, 3-bromo-phenyl, 3,4-dichloro-phenyl, 2,5-dibromo-phenyl and the like, or any other (esterified hydroxy)-phenyl group, (acyl)-phenyl, such as (lower alkanoyl)-phenyl, e.g., 4-acetyl-phenyl, 4-propionyl-phenyl and the like, or any other (acyl)-phenyl group, (mercapto)-phenyl, e.g., 4-mercapto-phenyl and the like, (etherified mercapto)-phenyl, such as (lower alkyl-mercapto)- phenyl, e.g., 4-methylmercapto-phenyl, 3-ethylmercapto-phenyl and the like, or any other (etherified mercapto)-phenyl group, (nitro)-phenyl, e.g., 4-nitro-phenyl and the like, (amino)-phenyl, particularly (tertiary amino)-phenyl, such as (N,N-di-lower alkyl-amino)-phenyl, e.g., 4-N,N-dimethylamino-phenyl, 3-N,N-diethylamino-phenyl and the like, or any other (tertiary amino)-phenyl group, (trifluoromethyl)-phenyl, e.g., 4-trifluoromethyl-phenyl and the like, or any other suitably substituted phenyl radical.

Salts of the compounds of this invention are acid addition salts, such as the pharmaceutically acceptable, non-toxic acid addition salts with inorganic acids, e.g., hydrochloric, hydrobromic, nitric, sulfuric, phosphoric acid and the like, with organic carboxylic acids, e.g., acetic, propionic, glycolic, lactic, succinic, maleic, hydroxymaleic, fumaric, malic, tartaric, citric, benzoic, salicylic, 2-acetoxybenzoic acid and the like, or with organic sulfonic acids, e.g., methane sulfonic, ethane sulfonic, 2-hydroxyethane sulfonic, benzene sulfonic, p-toluene sulfonic, naphthalene 2-sulfonic acid and the like. Other acid addition salts may be used as intermediates, for example, for the preparation of other acid addition salts, such as those pharmaceutically acceptable, or in the purification of the free compound, or may be used for identification or characterization purposes. Acid addition salts which are primarily used for identification purposes are particularly those with acidic organic nitro compounds, e.g., picric, picrolonic, flavianic acid and the like, or with metal complex acids, e.g., phosphotungstic, phosphomolybdic, chloroplatinic, Reinecke acid and the like.

The compounds of this invention produce an increase in coordinated motor activity in the unanesthetized dog, which effect is of considerable duration. They also antagonize sedation induced by administering tranquilizer-type sedatives; the antagonism becomes evident a short period after administration and is noticeable over an appreciable period. In view of these stimulating effects, the compounds of this invention can be used as stimulating agents to counteract excessive fatigue, lack of concentration, depressive states and the like, as well as in the treatment of barbiturate poisoning, or for the shortening of the recovery time after anesthesia. It has also been found, that the compounds of this invention have less toxic characteristics than known stimulating compounds.

Particularly useful as stimulating agents are the compounds of the formula

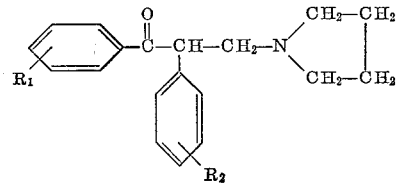

in which each of the groups $R_1$ and $R_2$ is above all hydrogen, as well as lower alkyl having from one to four carbon atoms, lower alkoxy having from one to four carbon atoms, halogeno having an atomic weight between 18 and 80, or trifluoromethyl, or an acid addition salt thereof.

The compounds of this invention may be prepared according to per se conventional methods; for example, they are formed by reacting a ketone of the formula

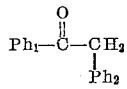

in which $Ph_1$ and $Ph_2$ have the previously-given meaning, with pyrrolidine or a salt thereof in the presence of formaldehyde or a reactive derivative thereof, and, if desired, converting a resulting salt into the free compound or into another salt, and/or, if desired, converting a resulting compound into a salt thereof, and/or, if desired, separating a mixture of isomers into the single isomers.

The above reaction of the starting material with pyrrolidine in the presence of formaldehyde or a reactive derivative thereof is carried out according to the procedure known as the Mannich Reaction, which is described, for example, in detail by F. F. Blicke in Organic Reactions, volume 1, page 303 (Wiley, 1942). A salt of pyrrolidine is particularly an acid addition salt with a mineral acid, e.g., hydrochloric, hydrobromic, sulfuric acid and the like. Reactive derivatives of formaldehyde are those furnishing formaldehyde under the conditions of the reaction; such derivatives are, for example, polymeric derivatives of formaldehyde, e.g., paraformaldehyde, trioxane and the like, acetals of formaldehyde with lower alkanols, e.g., dimethoxymethane, diethoxymethane and the like, hexamethylenetetramine, or any other suitable formaldehyde-furnishing reagent. The reaction is preferably carried out in the presence of an inert solvent, for example, a lower alkanol, e.g., ethanol and the like, preferably at an elevated temperature, and, if necessary, in the presence of a small amount of an acid, such as a mineral acid, e.g., hydrochloric, sulfuric acid and the like, and/or, in a closed vessel, and/or, in the atmosphere of an inert gas, e.g., nitrogen.

The starting materials are known and can be prepared by per se conventional methods.

The compounds of this invention may also be prepared by reacting a compound of the formula

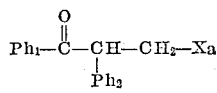

in which $Ph_1$ and $Ph_2$ have the previously-given meaning, and $X_a$ is a reactive esterified hydroxyl group, with pyrrolidine, and, if desired, carrying out the optional steps.

The reactive esterified hydroxyl group $X_a$ stands primarily for halogeno (representing a hydroxyl group esterified with a hydrohalic acid), e.g., chloro, bromo and the like, as well as an organic sulfonyloxy group, e.g., p-toluene sulfonyloxy and the like. The above reaction between the reactive ester and pyrrolidine is carried out according to per se conventional methods, preferably by maintaining an excess of pyrrolidine, which may simultaneously serve as a base to neutralize the generated acid. The latter may also be achieved by adding another alkaline reagent, e.g., sodium carbonate, potassium carbonate and the like. The reaction is preferably completed at an elevated temperature, if desired, in the presence of an inert solvent, such as, for example, a lower alkanol, e.g., methanol, ethanol and the like, or any other suitable diluent, and/or, in a closed vessel, and/or in the atmosphere of an inert gas, e.g., nitrogen.

The starting materials may be prepared according to methods known per se, for example, by introducing into the α-position of a compound of the formula

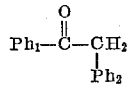

in which $Ph_1$ and $Ph_2$ have the previously-given meaning, a carbo-lower alkoxy group, e.g., carbethoxy and the like (for example, by treatment of an alkali metal compound of the ketone with a lower alkyl orthoformate, e.g., ethyl orthoformate and the like) or a hydroxymethylene group (for example, by treating an alkali metal compound of the ketone with a lower alkyl formate, e.g., ethyl formate and the like). In a resulting compound, the carbo-lower alkoxy (if necessary, after hydrolysis to the free carboxyl group) or the hydroxymethylene group is then converted into a hydroxy-methyl group by reduction, for example, by treatment with a hydride reagent, e.g., lithium aluminum hydride and the like, or any other suitable reduction procedure, such as catalytic hydrogenation, electrolytic reduction and the like. The hydroxy-methyl group may also be introduced directly into the α-position of the above starting material, for example, by reacting the latter with formaldehyde or a formaldehyde-furnishing reagent, e.g., paraformaldehyde and the like, in the presence of a suitable base, e.g., sodium carbonate and the like. The free hydroxyl group of the hydroxy-methyl portion of the resulting compound is then replaced by the desired reactive esterified hydroxyl group, for example, by halogeno (e.g., by treatment with a thionyl halide, e.g., thionyl chloride and the like, or a phosphorous halide, e.g., phosphorous tribromide and the like), or by an organic sulfonyloxy group (e.g., by esterification with an organic sulfonic acid halide, e.g., p-toluene sulfonic acid chloride and the like, preferably in the presence of a base, e.g., pyridine and the like).

The compounds of this invention may also be prepared, for example, by reacting a metal reagent of the formula $Ph_1^{\ominus} M^{\oplus}$, in which $Ph_1$ has the previously given meaning, and $M^{\oplus}$ stands for the cation of certain metals of the group IA of the Periodic System, or particularly for the cation of the formula Hal-Met$^{\oplus}$, in which Met stands for certain metals of the group IIA of the Periodic System, and Hal stands for halogeno, with a compound of the formula:

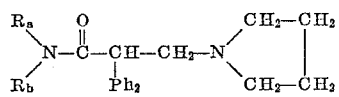

in which $Ph_2$ has the previously given meaning, and each of the groups $R_a$ and $R_b$ stands for hydrogen or an organic substituent, and, if desired, carrying out the optional steps.

The cation of certain metals of the group IA of the Periodic System, represented by $M^{\oplus}$, is that of certain alkali metals, particularly lithium, as well as sodium. Preferably, $M^{\oplus}$ is the group Hal-Met$^{\oplus}$, which stands primarily for Hal-Mg$^{\oplus}$, in which Hal is halogeno, having an atomic weight greater than 35, e.g., chloro, bromo and the like. These metal reagents are known or are prepared according to known methods.

In the acid amide starting materials, each of the groups $R_a$ and $R_b$, which are preferably hydrogen, may also be an organic radical, particularly lower alkyl, e.g., methyl, ethyl and the like. The above reaction is carried out according to known methods, especially in the presence of an inert solvent, if necessary, at an elevated temperature and/or in the atmosphere of an inert gas, e.g., nitrogen.

The starting materials used in the above reaction are prepared according to known methods, for example, by reacting a compound of the formula

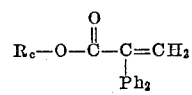

in which the group $Ph_2$ has the previously given meaning, and $R_c$ is lower alkyl, with pyrrolidine and converting the esterified carboxyl group into the desired amide group by treatment with ammonia, a primary amine or a secondary amine; these reactions are carried out according to known methods.

The compounds of this invention may also be prepared by oxidizing the carbinol group in a compound of the formula

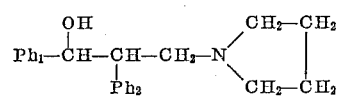

in which $Ph_1$ and $Ph_2$ have the previously given meaning, or a salt thereof, into a carbonyl group, and, if desired, carrying out the optional steps.

Oxidation of the carbinol into the carbonyl group is carried out according to known methods, for example, by treatment with an oxidation reagent containing hexavalent chromium, e.g., potassium dichromate, chromium trioxide (for example, in the form of the complex with pyridine) and the like, with aluminum tertiary butanolate according to the Oppenauer oxidation reaction as described, for example, by C. Djerassi, Organic Reactions, volume 6, page 207 (Wiley, 1951), or any other oxidation method suitable for the conversion of a carbinol into a carbonyl group.

The starting materials used in the above procedure may be prepared, for example, by reacting a compound of the formula

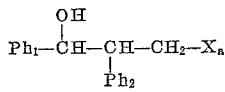

in which $Ph_1$, $Ph_2$ and $X_a$ have the previously-given meaning, with pyrrolidine; this reaction is carried out according to the previously-described method. The intermediates used in the above reaction may be obtained, for example, by converting in a compound having the formula

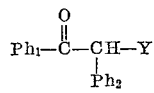

in which $Ph_1$ and $Ph_2$ have the above-given meaning, and Y stands for a group of the formula —$CH_2$—$X_a$, in which $X_a$ is a reactive esterified hydroxyl group, or a carbinol group or a group capable of being converted into a carbinol group (such as a carbo-lower alkoxy group, e.g., carbethoxy and the like, a hydroxymethylene group and the like), the carbonyl group adjacent to the group $Ph_1$ into a carbinol group (for example, according to one of the reduction methods previously described), and, if necessary, converting in a resulting compound, in which Y stands for a group capable of being converted into a carbinol group, such group into a carbinol group (for example, by one of the reduction methods previously described), and/or, if necessary, converting in a resulting compound, in which the group Y is a carbinol group, such carbinol group into the group of the formula —$CH_2$—$X_a$, in which $X_a$ is a reactive esterified group (for example, by treatment with a thionyl halide, e.g., thionyl chloride and the like, or with an organic sulfonyl halide, e.g., chloride and the like, according to the previously-shown procedure).

The starting materials used in the above oxidation procedure used for the preparation of the ketone compounds of this invention may also be prepared, for example, by converting in a compound having the formula

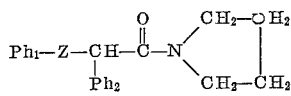

in which $Ph_1$ and $Ph_2$ have the previously-given meaning, and Z stands for a carbinol group or a carbonyl group, the carbonyl group of the formula >C=O into methylene, and, if necessary, converting in a resulting compound having a carbonyl group, such carbonyl group into a carbinol group.

A carbonyl group of the formula >C=O represents the carbonyl portion of the amide grouping, which is converted into a methylene group according to known methods, for example, by treatment with a suitable hydride reagent, e.g., lithium aluminum hydride and the like. In starting materials, in which Z stands for a carbonyl group, such group may be reduced simultaneously to the desired carbinol group. The intermediates used in the above reaction are prepared according to known methods, such as those previously shown. If desired, a carbonyl group Z is converted into the carbinol group using one of the previously-described reduction methods, which do not attack the carbonyl of an amide grouping, such as, for example, treatment with hydrogen in the presence of a suitable catalyst, or with certain metal lower alkanolates, e.g., aluminum isopropanolate and the like (these methods have been previously outlined).

The carbinol starting materials used in the above oxidation procedure may also be prepared, for example, by reducing the double bond in a compound of the formula

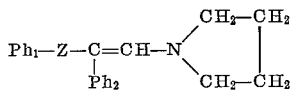

in which $Ph_1$ and $Ph_2$ have the previously-given meaning, into a single bond. Reduction of the double bond is carried out as previously-described (for example, by treatment with a suitable hydride, catalytically activated hydrogen and the like). In a starting material, in which Z stands for a carbonyl group, such group is simultaneously converted into a carbinol group. The intermediates used in the above reaction are prepared, for example, by introducing into a compound of the formula

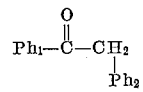

in which $Ph_1$ and $Ph_2$ have the previously-given meaning, a hydroxymethylene group according to the previously-described method (for example, by reacting an alkali metal compound of the ketone with a lower alkyl formate), and reacting the resulting compound having a hydroxy-methylene group in α-position to the carbonyl group with pyrrolidine, and, if desired, converting the carbonyl group adjacent to the monocyclic carbocyclic aryl position $Ph_1$ into a carbinol group (for example, by reduction according to the Meerwein-Ponndorf-Verley method).

The carbinol compounds of the above formula and used in the oxidation procedure for the preparation of the compounds of this invention, may also be prepared by reacting a compound of the formula $Ph_1{\ominus}M{\oplus}$, in which $Ph_1$ and $M{\oplus}$ have the previously-given meaning, with an aldehyde of the formula

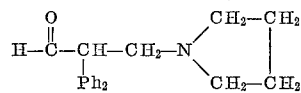

in which $Ph_2$ has the previously-given meaning. The above reaction is carried out according to the previously described method; the starting materials are prepared by adapting known methods to the appropirate starting materials.

Depending on the conditions used, the compounds of this invention are obtained in the form of the free bases or the salts.

A resulting acid addition salt may be converted into the free base, for example, by reacting it with a suitable hydroxyl ion exchange preparation, or with an alkaline reagent, such as a metal hydroxide, e.g., lithium hydroxide, sodium hydroxide, potassium hydroxide and the like, a metal carbonate, e.g., sodium, potassium or calcium carbonate or hydrogen carbonate and the like, ammonia or any other suitable basic reagent.

An acid addition salt may be converted directly into another acid addition salt, for example, by reacting it with a metal, e.g., sodium, barium, silver and the like, salt of an acid, preferably in the presence of a solvent, in which a resulting inorganic salt is insoluble and removed from the reaction medium, or with a suitable anion exchange preparation. For example, a resulting hydrobromide may be converted into the maleate by treatment with the monosodium salt of maleic acid in a suitable diluent.

A free compound may be converted into an acid addition salt by reaction with one of the inorganic or organic acids described hereinbefore, for example, by treating a solution of the base in a suitable solvent with the acid or a solution thereof and isolating the desired salt. The latter may also be obtained by reacting the free compound with a suitable anion exchange preparation. Salts may be obtained in the form of hydrates or may contain solvent of crystallization formation of the salts.

Compounds of this invention may be obtained as mixtures of isomers, which may be separated into the individual isomers. For example, racemates of the compounds of this invention may be resolved into the optically active d- and l- forms according to procedures used for the resolution of racemic compounds. For example, a solution of the free base of a racemic d,l-compound in an inert solvent may be treated with one of the optically active forms of an acid having at least one asymmetric carbon atom. Especially useful asoptically active forms of salt-forming acids having an asymmetric carbon atom are D-tartaric (l-tartaric) and L-tartaric (d-tartaric) acid, as well as the optically active forms of di-o-toluyl-tartaric, malic, mandelic, camphor 10-sulfonic, quinic acid and the like. A salt may then be isolated, which is formed by the optically active acid with one of the optically active forms of the base, and may be converted into the optically active base according to known methods, such as those mentioned hereinabove; the optically active base may then be converted into its acid addition salts.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 25 g. of desoxybenzoin, 14.8 g. of pyrrolidine hydrochloride, and 7.5 g. of paraformaldehyde in 25 ml. of ethanol containing 0.3 ml. of concentrated hydrochloric acid is refluxed for twelve hours. The solvent is then evaporated, the residue is taken up in water, and the aqueous solution, after being extracted with diethyl ether, is made basic with aqueous ammonia. The organic material is extracted with diethyl ether, and the organic solution is dried over magnesium sulfate and evaporated. The residue is crystallized from ethanol to yield the α-(phenyl)-β-(1-pyrrolidino)-propiophenone of the formula:

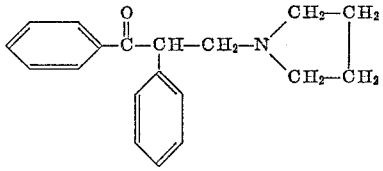

which melts at 89–90° after recrystallization from ethanol; yield: 16 g.

To a solution of the α-(phenyl)-β-(1-pyrrolidino)-propiophenone in diethyl ether is added an excess of a 7.5 N solution of hydrogen chloride in ethanol to yield the α-(phenyl)-β-(1-pyrrolidino)-propiophenone hydrochloride.

Other compounds, which may be prepared according to the above procedure are, for example, α-(p-methylphenyl)-β-(1-pyrrolidino)-propiophenone, p-bromo-α-(phenyl)-β-(1-pyrrolidino)-propiophenone, p-methoxy-α-(o-chloro-phenyl)-β-(1-pyrrolidino)-propiophenone, p-fluoro-α-(phenyl)-β-(1-pyrrolidino)-propiophenone, as well as p-acetyl-α-(phenyl)-β-(1-pyrrolidino)-propiophenone, α-(phenyl)-β-(1-pyrrolidino)-p-trifluoromethyl-propiophenone, o-chloro-α-(phenyl)-β-(1-pyrrolidino)-propiophenone, m-methyl-α-(phenyl)-β-(1-pyrrolidino)-propiophenone, and the like.

*Example 2*

A mixture of the crude β-hydroxy-α-(phenyl)-propiophenone p-toluene sulfonic acid ester (prepared according to the procedure described herein below) and 20.0 g. of pyrrolidine in 100 ml. of ethanol is refluxed, and the solvents are then evaporated under reduced pressure; the residue is treated with an aqueous solution of ammonia and the organic material is extracted with di-ethyl ether. The organic solution is separated, dried over sodium sulfate and evaporated. The residue is distilled to yield the desired α-(phenyl)-β-(1-pyrrolidino)-propiophenone, M.P. 89–90° after recrystallization from ethanol.

The starting material used in the above procedure is prepared as follows: A suspension of 60.05 g. of desoxybenzoin and 11.0 g. of paraformaldehyde in 500 ml. of water, containing 1.0 g. of sodium carbonate, is stirred for 48 hours. The solid β-hydroxyl-α-(phenyl)-propiophenone is filtered off, and 25.0 g. of this material is dissolved in 100 ml. of pyridine; the solution is treated with 30.0 g. of p-toluene sulfonic acid chloride. After standing for 24 hours, the mixture is poured into ice-water and the β-hydroxy-α-(phenyl)-propiophenone p-toluene sulfonic acid ester is filtered off.

In the above procedure, the β-hydroxy-α-(phenyl)-propiophenone p-toluene sulfonic acid ester may be replaced by β-chloro-α-(phenyl)-propiophenone or by β-bromo-α-(phenyl)-propiophenone; by refluxing the latter with pyrrolidine in the presence of ethanol, they are converted into the desired α-(phenyl)-β-(1-pyrrolidino)-propiophenone. The starting materials are prepared by reacting the β-hydroxy-α-(phenyl)-propiophenone with one mole of thionyl chloride in refluxing chloroform or with phosphorous tribromide, pouring the resulting compound into ice-water and isolating the desired β-halogeno-α-(phenyl)-propiophenone compound.

*Example 3*

To a mixture of 27.5 g. of 1,2-diphenyl-3-(1-pyrrolidino)-n-propanol in 100 ml. of pyridine is added slowly 12.2 g. of Sarrett's reagent (chromium trioxide-pyridine complex) while externally cooling to maintain room temperature. After twelve hours, the pyridine is distilled off under reduced pressure; the residue is diluted with water and treated with an aqueous solution of ammonium hydroxide. The organic material is extracted, the organic solution is separated, dried and evaporated, and the residue is crystallized from ethanol to yield the α-(phenyl)-β-(1-pyrrolidino)-propiophenone, M.P. 89–90° after recrystallization from ethanol.

The starting material used in the above procedure is prepared as follows: A solution of 100.0 g. of α-(phenyl)-acrolein in 500 ml. of absolute ethanol is saturated with hydrogen chloride while maintaining a temperature of 0°. After standing for two days at room temperature, the solvent is removed; 50.0 g. of the α-(phenyl)-β-chloro-propionaldehyde diethylacetal is refluxed for twelve hours in the presence of 40.0 g. of pyrrolidine in 200 ml. of ethanol. The solvent is removed under reduced pressure and the residue is dissolved in water; the aqueous mixture is made basic with ammonium hydroxide and is extracted with diethyl ether. The desired α-(phenyl)-β-(1-pyrrolidino)-propionaldehyde diethylacetal is purified by distilling the residue of the diethyl ether extract.

A solution of 50.0 g. of α-(phenyl)-β-(1-pyrrolidino)-propionaldehyde diethylacetal in 250 ml. of 2 N aqueous hydrochloric acid is allowed to stand for three days. The solution is then made basic and the α-(phenyl)-β-(1-pyrrolidino)-propionaldehyde is extracted with 200 ml. of anhydrous diethyl ether. After drying over magnesium sulfate, this ether solution is added to a Grignard reagent, prepared from 34.0 g. of bromobenzene and 5.5 g. of magnesium in 200 ml. of diethyl ether. After refluxing for two hours, the reaction mixture is cooled and treated with 150 ml. of a saturated aqueous solution of ammonium chloride; the organic layer is separated and washed with dilute aqueous hydrochloric acid. The combined acidic washings are rendered basic with aqueous ammonia; the organic material is extracted with diethyl ether and the desired 1,2-diphenyl-3-(1-pyrrolidino)-n-propanol is isolated by separating, drying and evaporating the organic solution and distilling the residue.

*Example 4*

To a Grignard reagent (prepared by reacting 62.0 g. of bromobenzene and 10 g. of magnesium in 500 ml. of diethyl ether and initiating the reaction by adding a small amount of crystalline iodine) is added a diethyl ether solution of α-(phenyl)-β-(1-pyrrolidino)-propionic acid amide (as prepared according to the procedure described below). The reaction mixture is refluxed for twelve hours, and is then cooled and treated dropwise with 200 ml. of a saturated aqueous solution of ammonium chloride. The diethyl ether solution is separated, and extracted with dilute aqueous hydrochloric acid. The combined aqueous extracts are made basic with an aqueous solution of ammonia, and the organic material is extracted with diethyl ether. The organic solution is separated, dried over sodium sulfate and evaporated. The residue is crystallized from ethanol to yield the desired α-(phenyl)-β-(1-pyrrolidino)-propiophenone, which melts at 89–90° after recrystallization from ethanol.

The starting material used in the above procedure may be prepared as follows: To a solution of 60.0 g. of methyl α-phenyl-acrylate in 200 ml. of ethanol, containing 1 ml. of a 30 percent solution of benzyl trimethyl ammonium hydroxide, is added 28.0 g. of pyrrolidine while externally cooling. After reacting for six hours at room temperature, the reaction mixture is saturated with dry ammonia and is allowed to stand at room temperature for one week. The solvent is distilled off under reduced pressure to yield the crude α-(phenyl)-β-(1-pyrrolidino)-propionic acid amide, which is purified by dissolving it in 100 ml. of anhydrous diethyl ether, washing the organic solution twice with water and drying over magnesium sulfate, and used without further isolation.

*Example 5*

The compounds of this invention may be used in the form of compositions for enteral or parenteral use, which contain the new compounds in admixture with an organic or inorganic, solid or liquid carrier. These preparations are manufactured according to known methods, and carrier materials are employed which do not react with the new compounds, such as water, gelatine, lactose, starches, stearic acid, magnesium stearate, calcium stearate, stearyl alcohol, talcum, vegetable oils, benzyl alcohol, gums, tragacanth, propylene glycol, polyalkylene glycols or any other carrier useful for the preparation of compositions. The latter may be in solid form, for example, as capsules, tablets, and the like, or in liquid form, for example, as solutions, suspensions, emulsions, and the like. If desired, they may contain auxiliary substances, such as preserving, stabilizing, wetting, emulsifying, coloring, flavoring agents, and the like, salts for varying the osmotic pressure, buffers, etc. They may also contain, in combination, other useful substances.

Compositions included within the scope of this invention contain from about one percent to about fifty percent of a compound of the formula

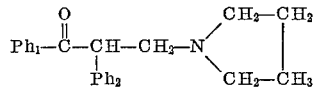

in which $Ph_1$ and $Ph_2$ have the previously-given meaning, or a pharmaceutically acceptable non-toxic acid addition salt thereof, together with a carrier. For example, compositions for oral administration contain from about 0.005 g. to about 0.05 g., preferably from about 0.01 g. to about 0.03 g. of one of the above compounds, especially of a compound of the formula

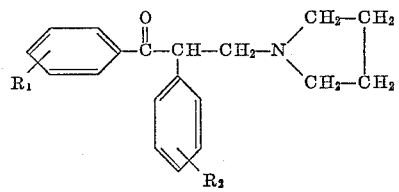

in which $R_1$ and $R_2$ have the previously-given meaning, particularly of α-(phenyl)-β-(1-pyrrolidino)-propiophenone, or a pharmaceutically acceptable, non-toxic acid addition salt thereof, together with a carrier.

Tablets containing 0.02 g. of α-(phenyl)-β-(1-pyrrolidino)-propiophenone hydrochloride, may be prepared as follows (for 1,000,000 tablets):

Ingredients:

| | |
|---|---:|
| α-(phenyl)-β-(1-pyrrolidino)-propiophenone hydrochloride _____g__ | 20,000 |
| Tragacanth BC _____g__ | 4,000 |
| Lactose _____g__ | 123,980 |
| Confectioner's sugar _____g__ | 30,000 |
| Color D&C Orange No. 3 _____g__ | 20 |
| Talcum _____g__ | 10,000 |
| Corn starch _____g__ | 10,000 |
| Magnesium stearate _____g__ | 2,000 |
| Anhydrous alcohol 3A _____ml__ | 10,000 |
| Purified water _____ml__ | 10,000 |

The α-(phenyl)-β-(1-pyrrolidino)-propiophenone hydrochloride and the tragacanth are passed through a Fitzpatrick mill, set at low speed, knives forward and using a No. 1 Type A screen. The D&C Orange No. 3 is triturated with 3,000 g. of lactose, previously screened through a No. 16 sieve. 120,980 g. of lactose is screened through a No. 16 sieve and is placed into a mixer; the color triturate, the α-(phenyl)-β-(1-pyrrolidino)-propiophenone hydrochloride-tragacanth mixture, and the confectioner's sugar (previously passed through a No. 16 screen) are added in this order. Mixing is maintained at high speed (68 r.p.m.) for twenty minutes; 20,000 ml. of 50 percent alcohol 3A is added, and mixing is continued at the same speed for thirty minutes to form the granules; additional 50 percent alcohol 3A is added, if needed.

The wet granules are passed through a Fitzpatrick mill set at low speed, knives forward and using a No. 4 Type A screen. The product is spread on trays and dried for about two and one-half hours at 43.3° using circulating dehumidified air; the moisture content of the dried product is between about 2.5 percent minimum and 3 percent maximum. The granules are then passed through a Fitzpatrick mill, set at medium speed, knives forward and using a No. 2 Type A screen. The granules are placed into a mixer and the talcum, corn starch and magnesium stearate used as the lubricants are added through a No. 16 screen. Mixing is maintained for twenty minutes, at high speed, and the granules are compressed into tablets weighing 0.2 g. each, using 10/32 inch shallow concave punches.

What is claimed is:

1. A member selected from the group consisting of a compound of the formula

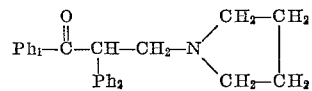

in which each of the groups $Ph_1$ and $Ph_2$ is a member selected from the group consisting of (lower alkyl)-phenyl, (lower alkoxy)-phenyl, (halogeno)-phenyl and (trifluoromethyl)-phenyl, and an acid addition salt thereof.

2. α-(Phenyl)-β-(1-pyrrolidino)-propiophenone.

3. An acid addition salt of α-phenyl-β-(1-pyrrolidino)-propiophenone.

4. α-Phenyl-β-(1-pyrrolidino)-propiophenone hydrochloride.

References Cited by the Examiner

UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,283,817 | 5/42 | Martin et al. | 167—55 |
| 2,425,320 | 8/47 | Hill | 252—149 |
| 2,606,155 | 8/52 | Hill | 252—149 |
| 2,683,106 | 7/54 | Lewenstein | 167—67 |
| 3,026,326 | 3/62 | McKusik et al. | 260—326.5 |
| 3,028,396 | 4/62 | Albus et al. | 260—326.5 |

OTHER REFERENCES

Lespagnol et al., "Comptes Rendus," vol. 251, pp. 1591–92, (1960).

NICHOLAS S. RIZZO, *Primary Examiner.*